(12) United States Patent
Casey et al.

(10) Patent No.: US 8,705,201 B2
(45) Date of Patent: Apr. 22, 2014

(54) INFORMATION STORAGE DEVICE WITH A DAMPING INSERT SHEET BETWEEN A HOUSING BAY AND A DISK DRIVE

(75) Inventors: Shawn E. Casey, San Jose, CA (US); Jifang Tian, Fremont, CA (US); Tegan Campbell, Dana Point, CA (US); Hongqi Li, Redwood City, CA (US); William Flynn, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 21 days.

(21) Appl. No.: 13/331,889

(22) Filed: Dec. 20, 2011

(65) Prior Publication Data

US 2013/0155545 A1    Jun. 20, 2013

(51) Int. Cl.
*G11B 33/08* (2006.01)

(52) U.S. Cl.
USPC ............. 360/97.12; 360/97.19; 360/99.2; 360/99.21; 360/99.22

(58) Field of Classification Search
USPC .................................. 360/97.12, 97.19, 99.2
See application file for complete search history.

(56) References Cited

U.S. PATENT DOCUMENTS

| | | | |
|---|---|---|---|
| 4,713,714 A | 12/1987 | Gatti et al. |
| 4,831,476 A | 5/1989 | Branc et al. |
| 5,004,207 A | 4/1991 | Ishikawa et al. |
| 5,041,924 A | 8/1991 | Blackborow et al. |
| 5,081,551 A | 1/1992 | Aruga |
| 5,124,855 A | 6/1992 | Dew et al. |
| 5,216,582 A | 6/1993 | Russell et al. |
| 5,223,996 A | 6/1993 | Read et al. |
| 5,349,486 A | 9/1994 | Sugimoto et al. |
| 5,463,527 A | 10/1995 | Hager et al. |
| 5,535,092 A | 7/1996 | Bang |
| 5,654,875 A | 8/1997 | Lawson |
| 5,694,267 A | 12/1997 | Morehouse et al. |
| 5,726,834 A | 3/1998 | Eckberg et al. |
| 5,757,617 A | 5/1998 | Sherry |
| 5,777,821 A | 7/1998 | Pottebaum |
| 5,949,619 A | 9/1999 | Eckberg et al. |

(Continued)

FOREIGN PATENT DOCUMENTS

EP    355534 A2    2/1990

OTHER PUBLICATIONS

Shawn Casey, "Hard Drive Mounting in Notebook Computer Systems", 2579-771615-A00-P2, Feb. 2011, 29 pages, Western Digital White Paper available at www.wdc.com.

(Continued)

*Primary Examiner* — Wayne Young
*Assistant Examiner* — Carlos E Garcia

(57) ABSTRACT

A novel information storage device is disclosed and claimed. The information storage device includes a device housing with a generally rectangular bay to accommodate a disk drive. The generally rectangular bay includes a base portion and a plurality of side portions. The information storage device further includes a damping insert sheet disposed between the disk drive and the base portion. The damping insert sheet has a plurality of elastomeric cushions, for example with a cushion thickness in the range 0.5 mm to 10 mm, and a spanning sheet, for example having a sheet thickness in the range 0.02 mm to 0.35 mm. Each of the plurality of elastomeric cushions is attached to the spanning sheet. Each of the plurality of elastomeric cushions contacts and is compressed between the generally rectangular bay and the disk drive.

13 Claims, 4 Drawing Sheets

(56) References Cited

U.S. PATENT DOCUMENTS

| | | | |
|---|---|---|---|
| 5,958,212 A * | 9/1999 | Yamamura et al. | 205/723 |
| 6,125,097 A | 9/2000 | Wu | |
| 6,130,817 A | 10/2000 | Flotho et al. | |
| 6,154,360 A | 11/2000 | Kaczeus, Sr. et al. | |
| 6,166,901 A | 12/2000 | Gamble et al. | |
| 6,249,432 B1 * | 6/2001 | Gamble et al. | 361/679.35 |
| 6,275,352 B1 | 8/2001 | Tadepalli et al. | |
| 6,281,433 B1 * | 8/2001 | Decker et al. | 174/394 |
| 6,285,545 B1 | 9/2001 | Lopez | |
| 6,292,359 B1 | 9/2001 | Boe | |
| 6,487,039 B1 * | 11/2002 | Bernett | 360/99.16 |
| 6,496,362 B2 | 12/2002 | Osterhout et al. | |
| 6,498,722 B1 | 12/2002 | Stolz et al. | |
| 6,545,865 B2 * | 4/2003 | Albrecht et al. | 361/679.34 |
| 6,567,265 B1 | 5/2003 | Yamamura et al. | |
| 6,618,246 B2 | 9/2003 | Sullivan et al. | |
| 6,714,405 B2 | 3/2004 | Jitsukawa | |
| 6,751,092 B1 * | 6/2004 | Ohnishi et al. | 361/679.34 |
| 6,873,524 B2 | 3/2005 | Kaczeus, Sr. et al. | |
| 6,958,884 B1 * | 10/2005 | Ojeda et al. | 360/97.19 |
| D512,422 S | 12/2005 | Sato et al. | |
| 7,106,582 B2 | 9/2006 | Albrecht et al. | |
| 7,106,583 B2 | 9/2006 | Koh et al. | |
| 7,187,543 B2 | 3/2007 | Zimlin | |
| 7,215,506 B2 | 5/2007 | Albrecht et al. | |
| 7,227,761 B2 | 6/2007 | Estes et al. | |
| 7,251,131 B2 * | 7/2007 | Shah et al. | 361/679.33 |
| 7,312,982 B2 * | 12/2007 | Bruner et al. | 361/679.33 |
| 7,375,922 B2 | 5/2008 | Chen et al. | |
| 7,450,375 B2 | 11/2008 | Xu | |
| 7,471,509 B1 * | 12/2008 | Oliver | 361/679.33 |
| 7,480,136 B2 | 1/2009 | Lalouette | |
| 7,483,238 B2 | 1/2009 | Xu et al. | |
| 7,561,375 B2 | 7/2009 | Kim et al. | |
| 7,667,925 B2 | 2/2010 | Kim et al. | |
| 7,701,705 B1 | 4/2010 | Szeremeta | |
| 7,817,373 B2 * | 10/2010 | Choi et al. | 360/97.19 |
| 8,300,352 B1 | 10/2012 | Larson et al. | |
| 8,462,460 B1 | 6/2013 | Szeremeta et al. | |
| 8,547,658 B1 | 10/2013 | Szeremeta | |
| 2003/0174464 A1 | 9/2003 | Funawatari et al. | |
| 2004/0032711 A1 | 2/2004 | Kaczeus, Sr. et al. | |
| 2004/0190193 A1 * | 9/2004 | Kuwajima | 360/97.01 |
| 2004/0255313 A1 | 12/2004 | Kaczeus, Sr. et al. | |
| 2005/0088778 A1 | 4/2005 | Chen et al. | |
| 2005/0180045 A1 | 8/2005 | Tsuda et al. | |
| 2005/0185326 A1 * | 8/2005 | Bruner et al. | 360/97.02 |
| 2005/0275966 A1 | 12/2005 | Janik et al. | |
| 2006/0001992 A1 * | 1/2006 | Friedrichs | 360/6 |
| 2006/0002076 A1 | 1/2006 | Albrecht et al. | |
| 2006/0158775 A1 | 7/2006 | Sega et al. | |
| 2007/0025014 A1 | 2/2007 | Kim | |
| 2007/0076327 A1 | 4/2007 | Yang et al. | |
| 2007/0133121 A1 | 6/2007 | Xu et al. | |
| 2007/0133122 A1 | 6/2007 | Kim et al. | |
| 2010/0290154 A1 | 11/2010 | Kim et al. | |

OTHER PUBLICATIONS

Peter A. Masterson, "Isolation Techniques for 2.5-Inch Hard Disk Drives", https://www.earsc.com, 4 pages.

Seagate "Disc Drive Acoustics", Oct. 2001, 7 pages.

* cited by examiner

INFORMATION STORAGE DEVICE WITH A DAMPING INSERT SHEET BETWEEN A HOUSING BAY AND A DISK DRIVE

BACKGROUND

Information storage devices include computer systems and other consumer electronics products that can retrieve and/or store data. An information storage device may incorporate a magnetic hard disk drive. Magnetic hard disk drives are sensitive to their external environment, including mechanical shocks and vibrations, externally applied forces and electromagnetic fields, contamination, changes in temperature and/or humidity, etc. Therefore, an information storage device's housing and mounting system for an incorporated hard disk drive may affect overall device performance, reliability, and lifetime.

Disk drives may be housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, and some degree of isolation from external mechanical shocks, and some attenuation of vibration and acoustic transmission.

Other information storage devices are external to another system for which they retrieve and/or store data. For example, a so-called "external" hard disk drive device includes a disk drive within a dedicated housing which may provide electromagnetic shielding, active or passive cooling, and some degree of isolation from external mechanical shocks, and some attenuation of vibration and acoustic transmission.

The mounting systems and housings for disk drives in modern information storage devices must often meet challenging space and cost requirements. Accordingly, there is an ongoing need in the art for improved disk drive mounting systems and housings in information storage devices.

DETAILED DESCRIPTION OF EXEMPLARY EMBODIMENTS

Figure 1:
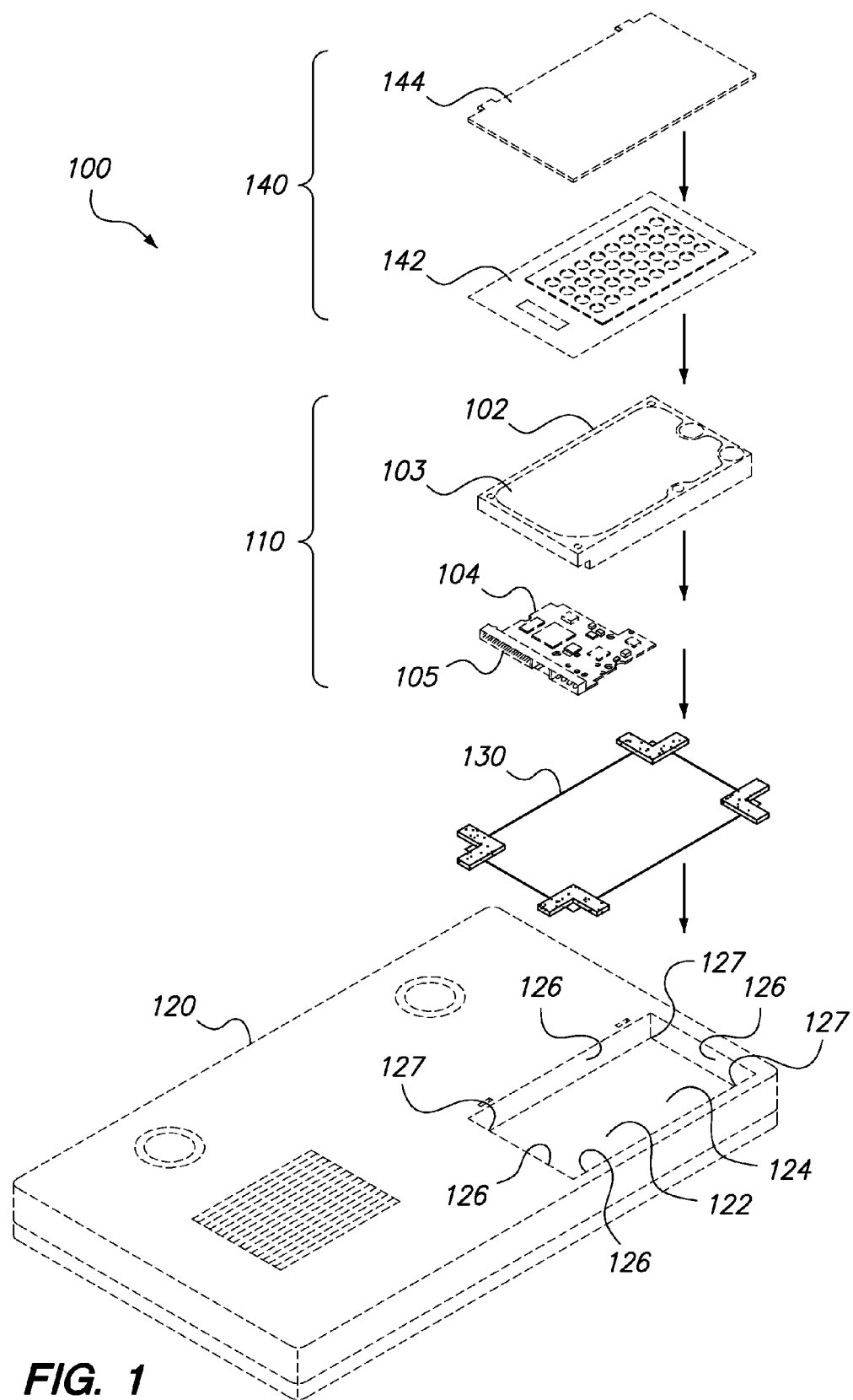
FIG. 1 is a bottom perspective exploded view of an information storage device according to an embodiment of the present invention.

FIG. 1 is a bottom perspective exploded view of an information storage device 100 according to an embodiment of the present invention. The information storage device 100 includes a disk drive 110 that has a head disk assembly (HDA) 102 and a printed circuit board assembly (PCBA) 104. The information storage device 100 also includes a device housing 120 that includes a generally rectangular bay 122 to accommodate the disk drive 110. The generally rectangular bay 122 includes a base portion 124 and a plurality of side portions 126. The base portion 124 may be an upper portion of a downward facing bay 122 in a laptop computer, where the bay is accessed from underneath the laptop, as shown in FIG. 1, for example. However, base portion 124 may alternatively be a bottom portion of an upward facing bay 122, for example where the bay 122 is accessed by lifting off all or a portion of the keyboard.

The information storage device 100 of FIG. 1 also includes a bay cover 140 that encloses the disk drive 110 within the generally rectangular bay 122, by attachment of the bay cover 140 to the device housing 120 of the information storage device 100. The bay cover 140 may optionally include an electrically conductive cover component 142 for electromagnetic noise shielding, and an aesthetic cover component 144 that may comprise a material that matches or enhances the general exterior appearance of the device housing 120 of the information storage device 100. For example, the aesthetic cover component 144 may be a portion of the bottom face of a laptop computer, or may alternatively be all or a portion of the keyboard of a laptop computer.

Figure 2:
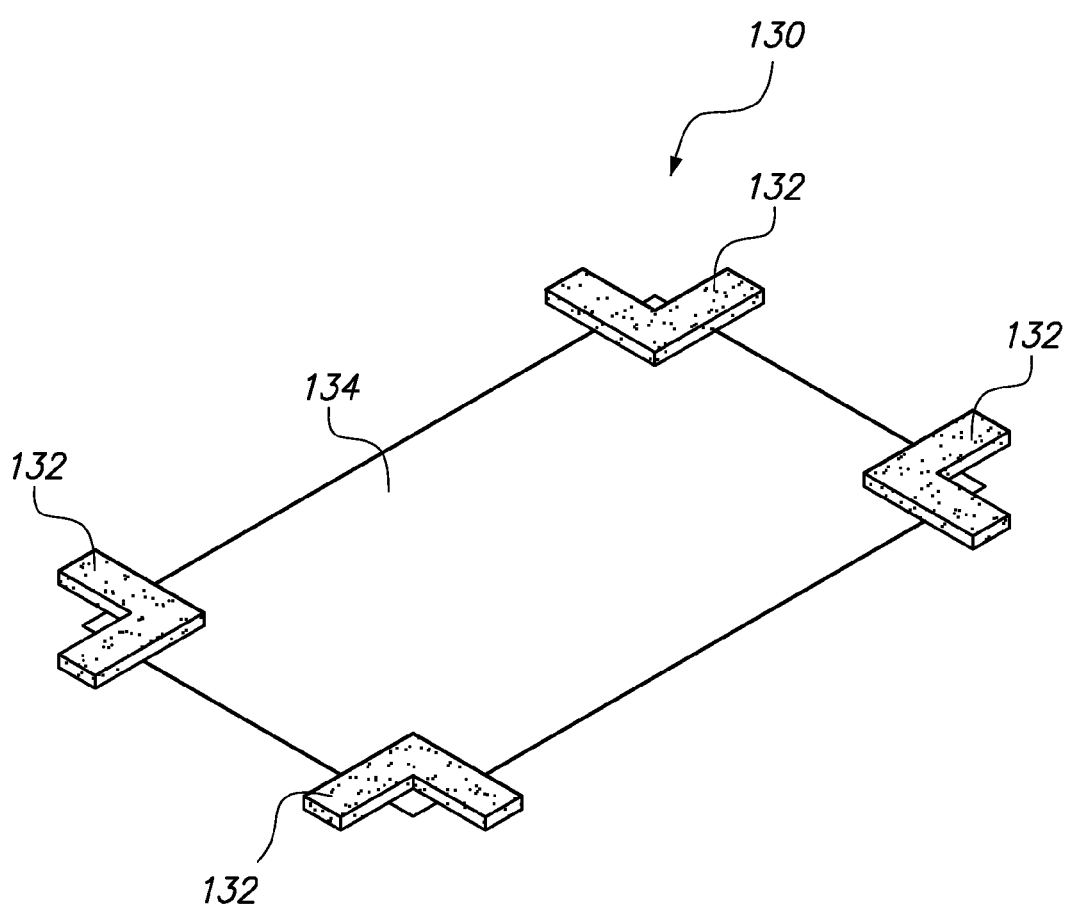
FIG. 2 depicts a damping insert sheet according to an embodiment of the present invention.

The information storage device 100 of FIG. 1 also includes a damping insert sheet 130 that is disposed between the disk drive 110 and the base portion 124 of the generally rectangular bay 122 of the device housing 120. FIG. 2 shows the damping insert sheet 130 in greater detail. Now referring to FIGS. 1 and 2, the damping insert sheet 130 may include a plurality of elastomeric cushions 132, and a spanning sheet 134. Each of the plurality of elastomeric cushions 132 is attached to the spanning sheet 134 and is thicker than the spanning sheet 134. For example, in certain embodiments, the plurality of elastomeric cushions 132 may have a cushion thickness in the range 0.5 mm to 10 mm, and the spanning sheet 134 may have a sheet thickness in the range 0.02 mm to 0.35 mm. Such dimensional ranges may enhance the ability of the damping insert sheet 130 to reduce the transmission of mechanical shocks and vibrations between the disk drive 110 and the device housing 120.

In the embodiment of FIG. 2, the spanning sheet may comprise a polymer material (e.g. polyester) that is optionally doped with a conventional electrically dissipative dopant, or optionally coated with a conventional electrically dissipative coating. The plurality of elastomeric cushions 132 optionally may be fabricated from a viscoelastic material, such as polyurethane foam, rubber, silicon rubber, EPDM rubber (ethylene propylene terpolymer), or butyl rubber (isombutylene-isoprene copolymer), or the like. The plurality of elastomeric cushions 132 optionally may be doped with an electrically dissipative dopant, or optionally coated with an electrically dissipative coating.

Figure 3:
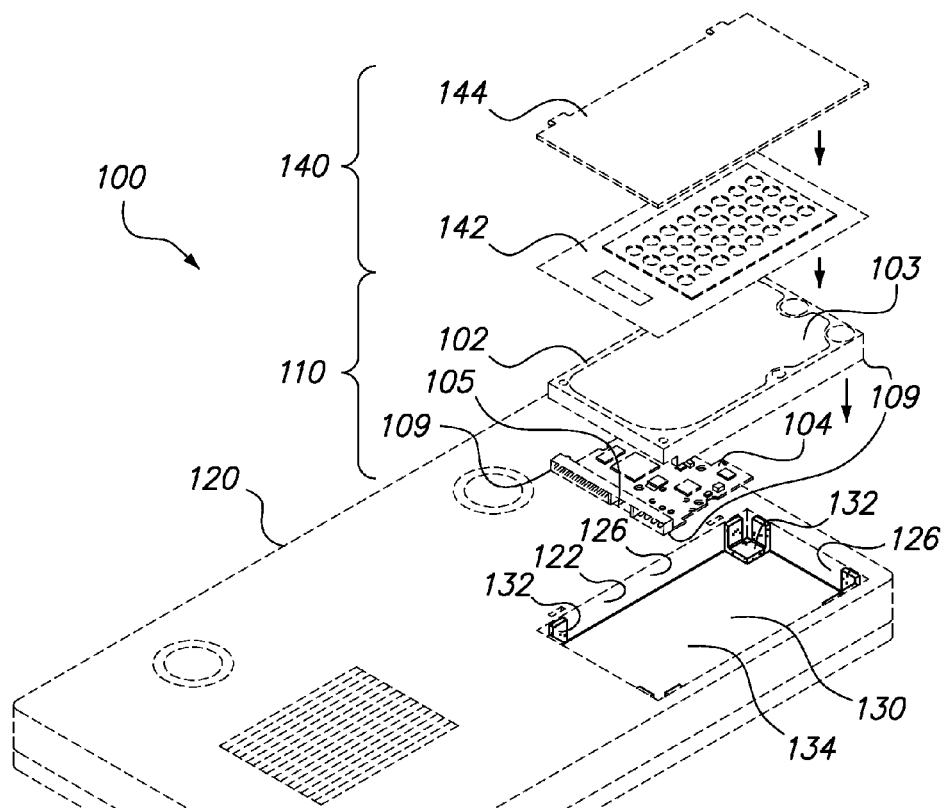
FIG. 3 is a bottom perspective exploded view of the information storage of FIG. 1, except with the damping insert sheet shown in its assembled position.
Figure 4:
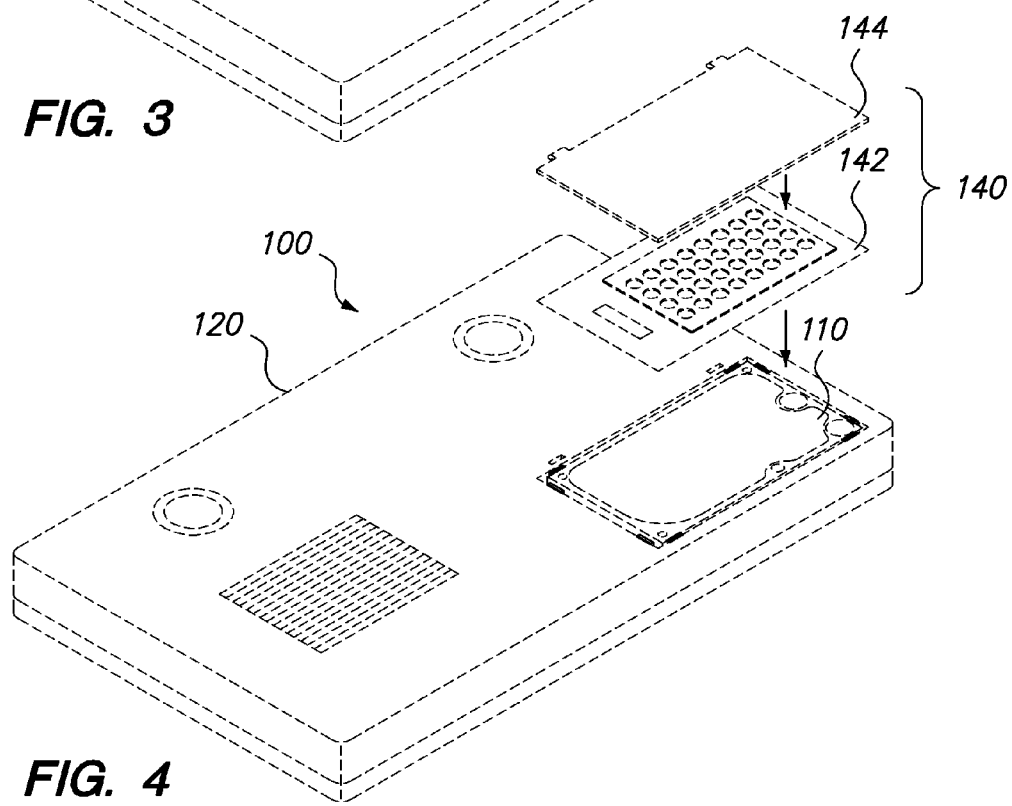
FIG. 4 is a bottom perspective exploded view of the information storage of FIG. 1, except with the damping insert sheet and disk drive shown in their assembled positions.

FIG. 3 is a bottom perspective exploded view of the information storage device 100 of FIG. 1, except with the damping insert sheet 130 shown in its assembled position. FIG. 4 is a bottom perspective exploded view of the information storage device 100 of FIG. 1, except with the damping insert sheet 130 and the disk drive 110 shown in their assembled positions. Now referring additionally to FIGS. 3 and 4, the HDA 102 includes a disk drive cover 103 that does not face the disk drive PCBA 104 after the PCBA 104 is attached to the HDA 102 during assembly. The disk drive PCBA 104 includes an electrical connector 105, and when the disk drive 110 is placed into the generally rectangular bay 122 of the device housing 120, the electrical connector 105 is attached to a mating electrical connector of the information storage device 100.

In the embodiment of FIGS. 1-4, it can be seen that each of the plurality of elastomeric cushions 132 contacts, and is compressed between the generally rectangular bay 122 and the disk drive 110 after assembly. Specifically, in this embodiment the damping insert sheet 130 is disposed between the disk drive PCBA 104, and the base portion 124 of the generally rectangular bay 122 of the device housing 120, with at least one of the plurality of elastomeric cushions 132 contacting the disk drive PCBA 104. In this embodiment, the disk drive cover 103 is adjacent and facing the electrically conductive cover component 142 of the bay cover 140, after assembly.

In the embodiment of FIGS. 1-4, the disk drive 110 defines a plurality of external disk drive corners 109. Preferably but not necessarily, the plurality of elastomeric cushions 132 may contact and be compressed between the generally rectangular bay 122 and the disk drive 110 adjacent one or more of the external disk drive corners 109. Also, preferably but not necessarily, the plurality of side portions 126 of the generally rectangular bay 122 meet to define a plurality of internal bay corners 127 adjacent the base portion 124, and each of the plurality of elastomeric cushions 132 contacts and is compressed between the generally rectangular bay 122 and the disk drive 110 adjacent a respective one of the plurality of internal bay corners 127. Such positioning of the plurality of elastomeric cushions 132 may enhance protection of the disk drive 110 from certain risks associated with mechanical shocks externally applied to the information storage device 100.

Figure 5:
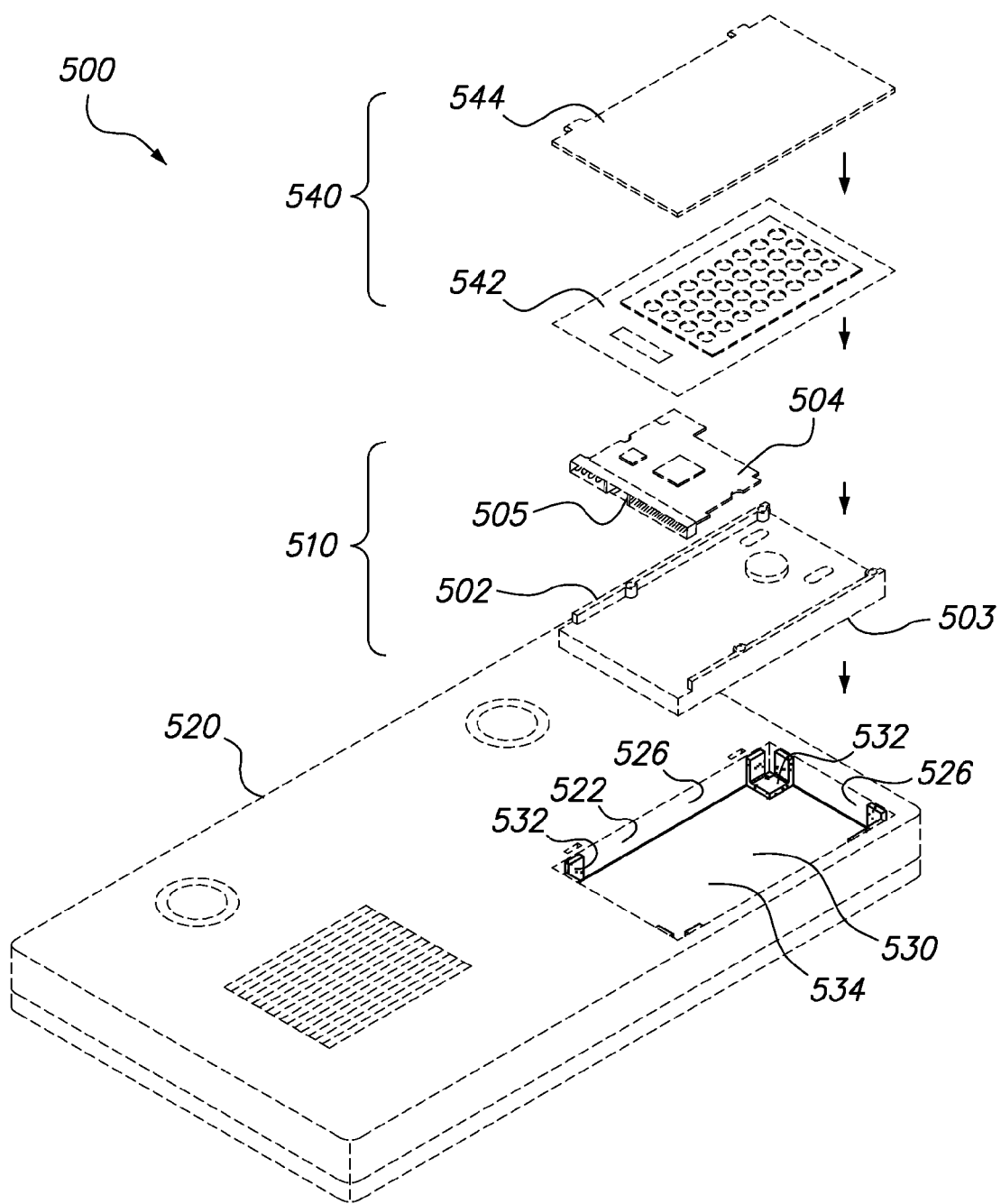
FIG. 5 is a bottom perspective exploded view of an information storage device according to another embodiment of the present invention.

FIG. 5 is a bottom perspective exploded view of an information storage device 500 according to another embodiment of the present invention. The information storage device 500 includes a disk drive 510 that has a head disk assembly (HDA) 502 and a printed circuit board assembly (PCBA) 504. The information storage device 500 also includes a device housing 520 that includes a generally rectangular bay 522 to accommodate the disk drive 510. The generally rectangular bay 522 includes a base portion and a plurality of side portions 526.

The information storage device 500 of FIG. 5 also includes a bay cover 540 that encloses the disk drive 510 within the generally rectangular bay 522, by attachment of the bay cover 540 to the device housing 520 of the information storage device 500. The bay cover 540 may optionally include an electrically conductive cover component 542 for electromagnetic noise shielding, and an aesthetic cover component 544 that may comprise a material that matches or enhances the general exterior appearance of the device housing 120 of the information storage device 500. For example, the aesthetic cover component 544 may be a portion of the bottom face of a laptop computer, or may alternatively be all or a portion of the keyboard of a laptop computer.

The information storage device 500 of FIG. 5 also includes a damping insert sheet 530 that is disposed between the disk drive 510 and the base portion of the generally rectangular bay 522 of the device housing 520. The damping insert sheet 530 may include a plurality of elastomeric cushions 532, and a spanning sheet 534. Each of the plurality of elastomeric cushions 532 is attached to the spanning sheet 534 and is thicker than the spanning sheet 534.

In the embodiment of FIG. 5, the HDA 502 includes a disk drive cover 503 that does not face the disk drive PCBA 504 after the PCBA 504 is attached to the HDA 502 during assembly. The disk drive PCBA 504 includes an electrical connector 505, and when the disk drive 510 is placed into the generally rectangular bay 522 of the device housing 520, the electrical connector 505 is attached to a mating electrical connector of the information storage device 500.

In the embodiment of FIG. 5, it can be seen that each of the plurality of elastomeric cushions 532 contacts and is compressed between the generally rectangular bay 522 and the disk drive 510 after assembly. Specifically, in this embodiment the damping insert sheet 530 is disposed between the disk drive cover 503, and the base portion of the generally rectangular bay 522 of the device housing 520, with at least one of the plurality of elastomeric cushions 532 contacting the disk drive cover 503. Such contact with the plurality of elastomeric cushions 132 may enhance protection of the disk drive 510 from certain risks associated with mechanical shocks externally applied to the information storage device 500. In this embodiment, the disk drive PCBA 504 is adjacent and facing the electrically conductive cover component 542 of the bay cover 540, after assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. An information storage device comprising:
   a disk drive;
   a device housing that includes a generally rectangular bay to accommodate the disk drive, the generally rectangular bay including a base portion and a plurality of side portions; and
   a damping insert sheet disposed between the disk drive and the base portion, the damping insert sheet comprising:
      a plurality of elastomeric cushions; and
      a spanning sheet lying on a single plane, each of the plurality of elastomeric cushions being attached to a corner of the spanning sheet, lying above the spanning sheet and extending beyond a perimeter of the spanning sheet in a non-compressed state, and being thicker than the spanning sheet;
   wherein each of the plurality of elastomeric cushions contacts, and is compressed between, the generally rectangular bay and the disk drive.

2. The information storage device of claim 1 wherein the disk drive has a head-disk assembly and a printed circuit board assembly (PCBA) attached to the head-disk assembly, the head-disk assembly including a disk drive cover that does not face the disk drive PCBA, and wherein the damping insert sheet is disposed between the disk drive PCBA and the base portion, with at least one of the plurality of elastomeric cushions contacting the disk drive PCBA.

3. The information storage device of claim 2 further comprising a bay cover that encloses the disk drive within the generally rectangular bay, the disk drive cover being adjacent and facing the bay cover.

4. The information storage device of claim 1 wherein the disk drive has a head-disk assembly and a printed circuit board assembly (PCBA) attached to the head-disk assembly, the head-disk assembly including a disk drive cover that does not face the disk drive PCBA, and wherein the damping insert sheet is disposed between the disk drive cover and the base portion, with at least one of the plurality of elastomeric cushions contacting the disk drive cover.

5. The information storage device of claim 4 further comprising a bay cover that encloses the disk drive within the generally rectangular bay, the disk drive PCBA being adjacent and facing the bay cover.

6. The information storage device of claim 1 wherein the disk drive defines a plurality of external disk drive corners and the plurality of elastomeric cushions contacts, and is compressed between, the generally rectangular bay and the disk drive adjacent a respective one of the external disk drive corners.

7. The information storage device of claim 1 wherein the plurality of side portions meet to define a plurality of internal bay corners adjacent the base portion, and each of the plurality of elastomeric cushions contacts, and is compressed between, the generally rectangular bay and the disk drive adjacent a respective one of the plurality of internal bay corners.

8. The information storage device of claim 1 wherein the spanning sheet comprises a polymer material that is doped with an electrically dissipative dopant.

9. The information storage device of claim 1 wherein the spanning sheet comprises a polymer material that is coated with an electrically dissipative coating.

10. The information storage device of claim 1 wherein the plurality of elastomeric cushions comprises a polyurethane foam doped with an electrically dissipative dopant.

11. The information storage device of claim 1 wherein the plurality of elastomeric cushions comprises a viscoelastic material coated with an electrically dissipative coating.

12. The information storage device of claim 1 wherein the elastomeric cushions have a cushion thickness in the range 0.5 mm to 10 mm, and the spanning sheet has a sheet thickness in the range 0.02 mm to 0.35 mm.

13. The information storage device of claim 1 further comprising a bay cover that encloses the disk drive within the generally rectangular bay, the bay cover comprising:
    a cover component; and
    an electrically conductive cover component located between the cover component and the disk drive.

* * * * *